(12) United States Patent
Westerman et al.

(10) Patent No.: US 6,622,190 B1
(45) Date of Patent: Sep. 16, 2003

(54) METHOD FOR MODIFYING TASK EXECUTION PRIORITY IN A MULTITASKING, WINDOWED OPERATING ENVIRONMENT

(75) Inventors: Larry Alan Westerman, Portland, OR (US); Octavio Garcia, Jr., Tigard, OR (US); Roy Kenneth Chrisop, Camas, WA (US)

(73) Assignee: Sharp Laboratories of America, Camas, WA (US)

( * ) Notice: Subject to any disclaimer, the term of this patent is extended or adjusted under 35 U.S.C. 154(b) by 0 days.

(21) Appl. No.: 09/561,265

(22) Filed: Apr. 27, 2000

(51) Int. Cl.[7] .................................................. G06F 1/00
(52) U.S. Cl. .......................... 710/244; 710/37; 710/38; 345/807
(58) Field of Search ................................. 710/240, 244, 710/264, 38, 262, 37; 709/102–105, 107, 106, 201; 345/790, 797, 794, 807

(56) References Cited

U.S. PATENT DOCUMENTS

| | | | |
|---|---|---|---|
| 4,736,309 A | | 4/1988 | Johnson et al. |
| 4,764,867 A | | 8/1988 | Hess |
| 4,769,636 A | | 9/1988 | Iwami et al. |
| 4,783,648 A | * | 11/1988 | Homma et al. ............. 345/794 |
| 4,920,514 A | | 4/1990 | Aoki |
| 4,954,818 A | * | 9/1990 | Nakane et al. ............. 345/790 |
| 5,075,675 A | | 12/1991 | Barker et al. |
| 5,129,055 A | * | 7/1992 | Yamazaki et al. .......... 345/807 |
| 5,237,653 A | * | 8/1993 | Noguchi et al. ............ 345/797 |
| 5,390,281 A | | 2/1995 | Luciw et al. |
| 5,542,088 A | * | 7/1996 | Jennings, Jr. et al. ....... 709/103 |
| 5,551,041 A | * | 8/1996 | Beethe ........................ 710/260 |
| 5,726,669 A | * | 3/1998 | Obata et al. ................. 345/2.2 |
| 5,767,852 A | * | 6/1998 | Keller et al. ................ 709/103 |
| 5,786,993 A | | 7/1998 | Frutiger et al. |
| 5,826,080 A | * | 10/1998 | Dworzecki ................... 709/103 |
| 5,995,997 A | * | 11/1999 | Horvitz ....................... 709/102 |
| 6,091,414 A | * | 7/2000 | Kraft, IV et al. ........... 709/103 |
| 6,148,324 A | * | 11/2000 | Ransom et al. ............. 709/105 |
| 6,301,602 B1 | * | 10/2001 | Ueki .......................... 703/103 |

* cited by examiner

*Primary Examiner*—Paul R. Myers
*Assistant Examiner*—Raymond N Phan
(74) *Attorney, Agent, or Firm*—Marger Johnson & McCollom

(57) ABSTRACT

A method for managing execution priorities in a multitasking operating system. The user sets execution priorities by the position of the application window on the screen relative to the other windows. When the user changes the position of the window, the system determines the new position relative to the other windows and reallocates the execution priorities based upon that window's new position. The allocation is done separately from the active window with which the user is currently interacting. In some instances, constraints may be placed upon the execution priority settings that prevent the system from exceeding certain maximums or going below certain minimums.

24 Claims, 2 Drawing Sheets

METHOD FOR MODIFYING TASK EXECUTION PRIORITY IN A MULTITASKING, WINDOWED OPERATING ENVIRONMENT

BACKGROUND OF THE INVENTION

1. Field of the Invention

This invention relates to multitasking operating systems with a windowing display system, more particularly to a method of assigning task execution priority in these systems.

2. Background of the Invention

Several operating systems exist that perform multitasking and use windows to display operating tasks. Examples include Microsoft Windows® 95/98/2000/NT/CE, X-Windows® and LINUX™. In the user interfaces of these systems, the operating tasks are typically each displayed in their own window. Typically, the highest priority task and the one with which the user is interacting is in the front most window.

This front most window, which will be referred to as the active window, typically overlaps and otherwise partially obscures the other windows. When the user selects another window, the newly selected window moves to the front. Examples of the management of the overall display can be found in U.S. Pat. No. 4,783,648, issued Nov. 8, 1988; U.S. Pat. No. 5,237,653, issued Aug. 17, 1993; U.S. Pat. No. 4,769,636, issued Sep. 6, 1988, issued Jul. 28, 1998.

Techniques to manage the movement of selected windows and the associated priorities can be found in U.S. Pat. No. 4,736,309, issued Apr. 5, 1988 and U.S. Pat. No. 5,075,675, issued Dec. 24, 1991. These two patents discuss the method of bringing the selected window to the front over the other windows by overlapping any other windows. Additionally, the '675 patent discusses the movement of a background window to the upper most part of the display when some communication data is received for the application running in that window. After the data is displayed, the window may or may not move back to its original position. This process has no interaction with the user but occurs upon reception of some data relevant to that application.

There are methods to allow the user to prioritize tasks. They typically require that the user launch a special operation or interface in which to set priorities. Examples of these types of interactive assignments can be found in U.S. Pat. No. 5,786,993, issued Jul. 28, 1998; U.S. Pat. No. 4,764,867, issued Nov. 15, 1988; U.S. Pat. No. 4,920,514, issued Apr. 24, 1990; and U.S. Pat. No. 5,390,281, issued Feb. 14, 1995.

However, none of these examples of the current state of the art allow the user to quickly and easily designate priorities for operating tasks separate from whatever task with which the user is interacting. This can lead to inefficient use of the processing power of the system and the user's time.

For example, the user wants a high priority task to run with the highest processing resource allocation. However, once that task starts, there is no user interaction required, and the user wants to move on to another task. If the user selects the window of the task on which the user wants to work, the new window overlaps the high priority task window. Correspondingly, the processing allocation to the high priority task is reduced to be less than that of the lower priority, but selected, window.

Therefore, some method that allows the user to allocate processing resources separate from the active window quickly and easily is needed.

SUMMARY OF THE INVENTION

One aspect of the invention is a method for modifying execution priority of a task in a multitasking operating system. The user provides input by moving one of the application windows. The system detects the input and adjusts the execution priority in accordance with the window new position on the screen.

Another aspect of the invention includes the ability to set or receive constraints upon the maximum and minimum execution priorities. These constraints can come from user input, the application software or some other source.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Most popular operating systems, such as Microsoft Windows® 95/98/2000/NT/CE, X-Windows and LINUX, have windowed interfaces that present the user with information about and the ability to interact with several tasks on their system. The active window is the window with which the user is interacting and is brought to the front of the other windows.

The active window is typically given a higher task priority and more of the processing duty cycles of the central processing unit (CPU). CPUs have a limit on their execution resources, and the active window is typically given the higher priority in the task list of the system as well as the largest 'amount' of execution resources.

However, this can lead to inefficient use of the system from the user's standpoint. For example, suppose the user is running a very long but high priority task on their system. The user wants to do some other tasks, but if the user brings the windows displaying those tasks to the front to work on them, execution resources are pulled from the high priority task and its position in the task list is lowered.

A more efficient method would be for the user to select execution priority and dedication of resources independent of the active window designation, where the active window is the window brought to the front. One aspect of this invention is a method that allows the user to have more control over the execution priority of tasks displayed in windows, as shown in FIG. 1.

It must be noted that some operating systems allow windows displaying active tasks to be reduced to an icon or a transparent window, also referred to as a window shade. This invention would still apply to these instances and the term window as defined here will be considered to include those examples.

Figure 1:
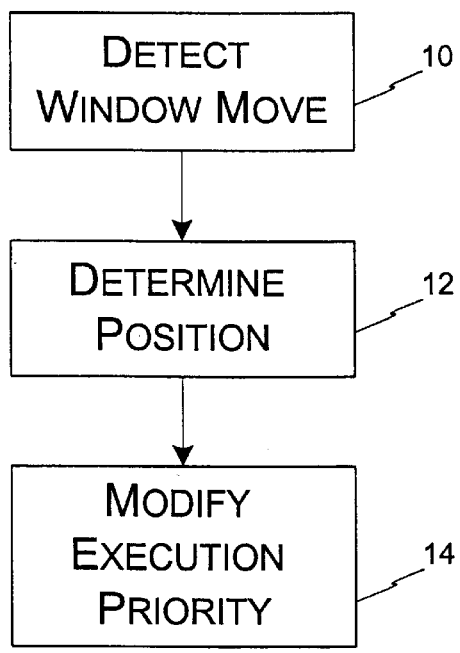
FIG. 1 shows a method of assigning execution priority based upon a change in the position of a window, in accordance with the invention.

In the method shown in FIG. 1, the user selects a window and moves its position relative to the other windows. At step 10, the move is detected. After determining that the window has moved, the system needs to determine what changes need to be made to execution priority, if any.

The window moved from a first position to a second position. At step 12, the system must determine where the second position is relative to the other windows. It is possible that the move was inadvertent and no changes in the relationships between windows occurred. In this case, the change of priority in step 14 would be no change.

However, the invention provides the user the ability to control the priority of the tasks displayed in the windows. Therefore, a change in the relationships between the windows will be assumed for discussion purposes. The operating system will then need to alter the task execution priority for that task based upon the new relationships.

Operating systems have data structures that maintain input/output flow control, screen position, screen size, and other characteristics related to handling applications windows. This data structure would need to be modified to include task execution priority for the applications window. When the window is moved, this invention would operate to modify the information in this data structure based upon the relationship of the new position to the other window positions.

There are two possibilities for the change in relationships. Either the selected window will have moved up relative to unselected windows or it will have moved down. If the window is moved up relative to the unselected windows, the task displayed in that window will have surpassed at least one of the unselected windows in execution priority. If the window is moved down relative to the unselected windows, the task displayed in that window will have dropped below at least one of the unselected windows in execution priority.

In either case, the operating system will have to reorder the task execution priority list and/or reallocate execution resources based upon the new priority list. For purposes of this discussion the reordering of the list and the reallocation of resources will be referred to as execution priority. Some operating systems may use a list, other may merely allocate processing resources dynamically without actually making such a list. The step of altering these processes will be referred to as modifying the execution priority as shown in step 14 of FIG. 1.

In one embodiment of the invention, the operating system may run without any constraints on the modification of the execution priority. However, in an alternative embodiment, some constraints may be established. In this embodiment, the constraint may come from the user or from the software package, as examples.

The user could select operating parameters for an application upon installation of the application, or upon launching the application. For example, the user could launch an application and the operating system would present the user with an interface. The interface would then query the user about parameters of the execution priority, such as a minimum amount of processing power percentage or a lowest position on the priority list. For example, the user may select that the C++ language compiler be never lower than second in the priority list or never receive less than 25% of the processor resources.

Alternatively, software packages could contain information that is used by the internal data structures of the operating system. This information would be accessible upon installation of the software package, which will be referred to as the application. Regardless of how the operating system obtains the information, the information would be used to control the manipulation of the execution priority according to the flowchart of FIG. 2.

Figure 2:
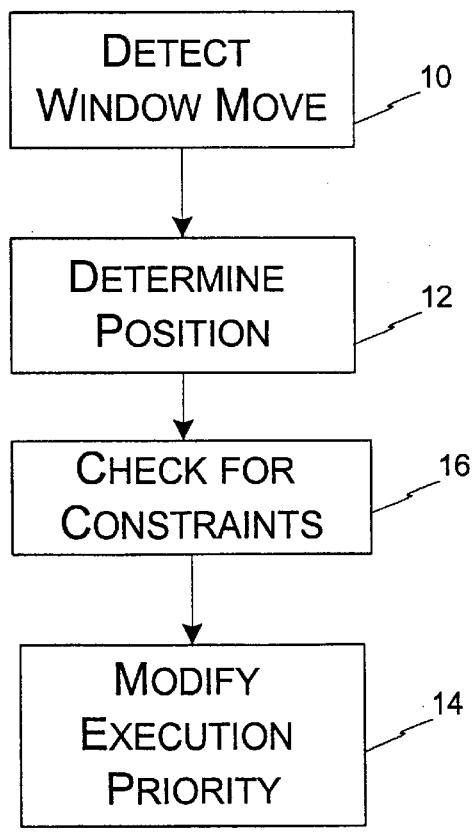
FIG. 2 shows a method of assigning execution priority based upon a change in the position of a window and a predefined constraint, in accordance with the invention.

In FIG. 2, the method proceeds through its first two steps as in the previous embodiment. However, prior to modifying the execution priority, the operating system would check to see if there were any constraints on assignments of execution priority. The constraints would operate to limit the operating systems ability to change the execution priority.

For example, the user selects an application window and moves it down to the lowest priority position among the open windows. However, lowering that application to that position in execution priority cannot be done without violating the constraint, either in position or processing allocation. The operating system would be forced to keep that application running at or above the minimum execution priority.

In another example, the user selects an application window and moves it up in priority. Due to the number of open windows and running tasks or the presence of a task that is constrained to have the highest priority, the operating system cannot comply with the user's selected execution priority. Note that in this instance, the constraint does not come from the selected window, but from the unselected windows.

It is possible that the constraints could be maximums, where the application has a maximum execution priority. In this instance, the constraint would operate if the user tried to move the application to a position that would result in the execution priority being too high. More than likely, this would only occur if the operating system used a priority list. The constraint in this example would be something like 'not higher than second.' If the user then tried to raise the application to the first position by putting it highest on the screen, the constraint would limit the system. If the constraint were in terms of processing allocation, the other windows would just be forced to run at a lower allocation than the maximum for the selected window.

In any of the above examples, the operating system could inform the user that it couldn't comply with the user input and give the reasons. Alternatively, the operating system could allow the windows to remain positioned where the user placed them and manage the execution priorities as determined by the constraints. It would seem preferable to inform the user of the inability to comply, either by a dialogue box or by forcing the window to a position corresponding to its constrained execution priority. The former approach would be more complicated, as the system would have to disconnect the position of the window from the execution priority on a case-by-case basis.

Figure 3:
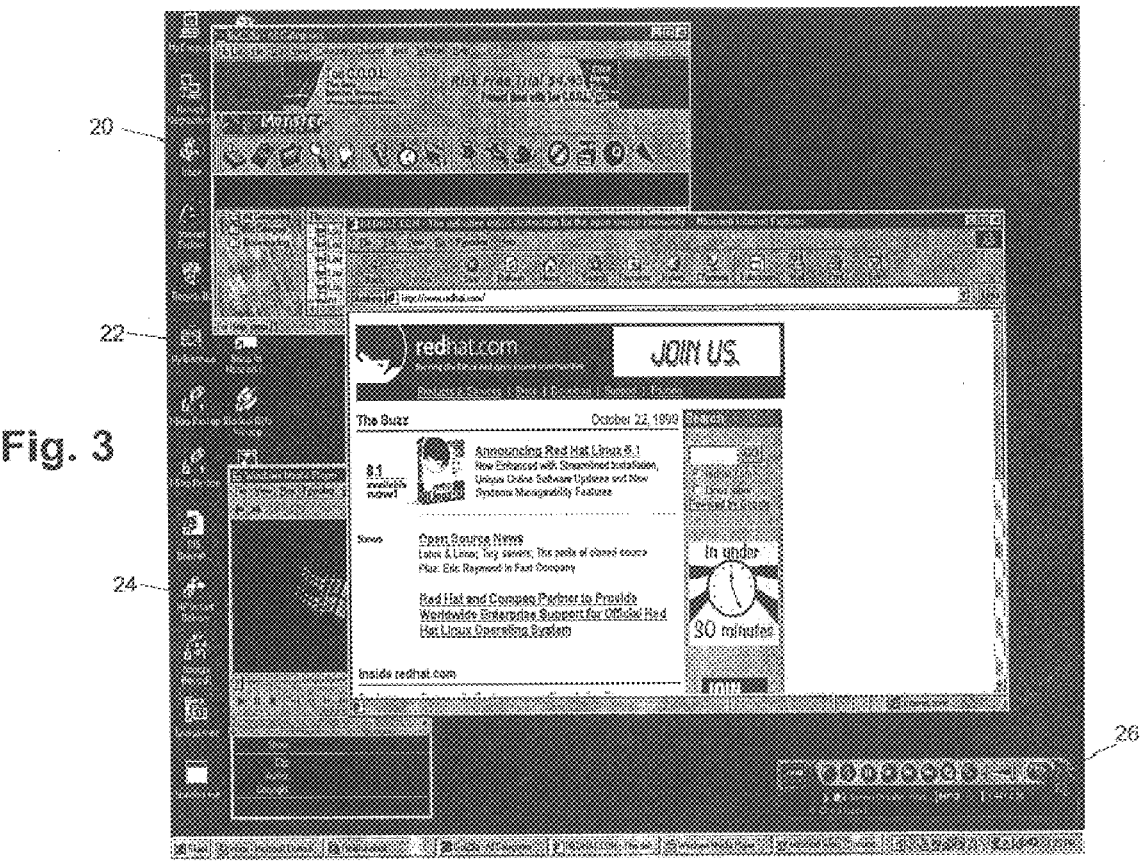
FIG. 3 shows a graphical representation of a user interface, in accordance with the invention.

FIG. 3 shows a screen shot of a windowed display with four open windows 20, 22, 24 and 26. Using this invention, the task displayed in window 20 has the highest priority. The web browser shown in window 22 is the next in priority, even though it is the 'active' window and is in front of all the other windows. The user is using this application, but it has a lower priority than the one displayed in window 20. Windows 24 and 26 are the next two in priority, respectively. Note that the horizontal position has no bearing on the priority tasking of the applications displayed in the windows.

In an alternative embodiment, the user could designate left or right to be higher priority and the vertical position would have no bearing on the priority. However, it seems more natural to use high and low positions to designate high and low priorities, so the preferred embodiment uses vertical positioning.

An advantage of this invention is that the priority of execution is not tied to the active or background status of an application window. As noted with regard to the example of FIG. 3, the active window with which the user is interacting does not have the highest priority. This allows the user to more efficiently utilize their processing resources.

Thus, although there has been described to this point a particular embodiment for a method for assigning task execution priority, it is not intended that such specific references be considered as limitations upon the scope of this invention except in-so-far as set forth in the following claims.

What is claimed is:

1. A method for modifying execution priority of a task in a multitasking operating system having an interactive windowed interface, the method comprising:

detecting a user input, wherein the user input moves a window on the interactive windowed interface from a first position to a second position;

determining the relationship between the other windows and the second position;

checking for any predefined constraints upon available execution resources, wherein the predefined constraint comprises a minimum execution priority for the selected window and the execution priority cannot be reduced to be lower than the minimum; and modifying the execution priority of a displayed task in the selected window based upon the relationship and the predefined constraints.

2. The method as claimed in claim 1 wherein the second position is higher than the first position and the priority for the displayed task is raised.

3. The method as claimed in claim 1 wherein the second position is lower than the first position and the priority for the displayed task is lowered.

4. The method as claimed in claim 1 wherein the selected window has been reduced to an icon.

5. The method as claimed in claim 1 wherein the selected window has been reduced to a window shade.

6. The method as claimed in claim 1 wherein the system informs the user that it cannot comply with the user input.

7. The method as claimed in claim 1 wherein the constraint is received from the user.

8. The method as claimed in claim 1 wherein the constraint is received from the application.

9. A method for modifying execution priority of a task in a multitasking operating system having an interactive windowed interface, the method comprising:

detecting a user input, wherein the user input moves a window on the interactive windowed interface from a first position to a second position;

determining the relationship between the other windows and the second position;

checking for any predefined constraint upon available execution resources, wherein the predefined constraint comprises a minimum execution priority on at least one unselected windows and the execution priority for the selected window is limited by this minimum; and modifying the execution priority of a displayed task in the selected window based upon the relationship and the predefined constraints.

10. The method as claimed in claim 9 wherein the second position is higher than the first position and the priority for the displayed task is raised.

11. The method as claimed in claim 9 wherein the second position is lower than the first position and the priority for the displayed task is lowered.

12. The method as claimed in claim 9 wherein the selected window has been reduced to an icon.

13. The method as claimed in claim 9 wherein the selected window has been reduced to a window shade.

14. The method as claimed in claim 9 wherein the system informs the user that it cannot comply with the user input.

15. The method as claimed in claim 9 wherein the constraint is received from the user.

16. The method as claimed in claim 9 wherein the constraint is received from the application.

17. A method for modifying execution priority of a task in a multitasking operating system having an interactive windowed interface, the method comprising:

detecting a user input, wherein the user input moves a window on the interactive windowed interface from a first position to a second position;

determining the relationship between the other windows and the second position;

checking for any predefined constraint upon available execution resources, wherein the predefined constraint is a maximum execution priority for the selected window and the execution priority cannot be raised to be higher than the maximum; and modifying the execution priority of a displayed task in the selected window based upon the relationship and the predefined constraints.

18. The method as claimed in claim 17 wherein the second position is higher than the first position and the priority for the displayed task is raised.

19. The method as claimed in claim 17 wherein the second position is lower than the first position and the priority for the displayed task is lowered.

20. The method as claimed in claim 17 wherein the selected window has been reduced to an icon.

21. The method as claimed in claim 17 wherein the selected window has been reduced to a window shade.

22. The method as claimed in claim 17 wherein the system informs the user that it cannot comply with the user input.

23. The method as claimed in claim 17 wherein the constraint is received from the user.

24. The method as claimed in claim 17 wherein the constraint is received from the application.

* * * * *

UNITED STATES PATENT AND TRADEMARK OFFICE
CERTIFICATE OF CORRECTION

PATENT NO.    : 6,622,190 B1 Page 1 of 1
DATED         : September 16, 2003
INVENTOR(S)   : Westerman et al.

It is certified that error appears in the above-identified patent and that said Letters Patent is hereby corrected as shown below:

Column 1,
Line 28, "issued Sep. 6, 1988, issued Jul. 28, 1998." should read
-- issued Sep. 6, 1998. --.

Column 5,
Line 20, "predefined constraints upon" should read -- predefined constraint upon --.

Signed and Sealed this

Twentieth Day of April, 2004

JON W. DUDAS
*Acting Director of the United States Patent and Trademark Office*